US011970948B2

(12) United States Patent
Nichols

(10) Patent No.: US 11,970,948 B2
(45) Date of Patent: Apr. 30, 2024

(54) VARIABLE VANE AIRFOIL WITH AIRFOIL TWIST TO ACCOMMODATE PROTUBERANCE

(71) Applicant: Pratt & Whitney Canada Corp., Longueuil (CA)

(72) Inventor: Jason Nichols, Mississauga (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 17/884,184

(22) Filed: Aug. 9, 2022

(65) Prior Publication Data

US 2024/0052754 A1 Feb. 15, 2024

(51) Int. Cl.

| | |
|---|---|
| ***F01D 17/16*** | (2006.01) |
| ***F01D 5/14*** | (2006.01) |
| ***F01D 7/00*** | (2006.01) |
| ***F01D 9/04*** | (2006.01) |

(52) U.S. Cl.

CPC ........... *F01D 17/162* (2013.01); *F01D 5/141* (2013.01); *F01D 5/147* (2013.01); *F01D 7/00* (2013.01); *F01D 9/041* (2013.01); *F05D 2240/128* (2013.01)

(58) Field of Classification Search

CPC ...... F04D 29/563; F04D 29/547; F01D 5/141; F01D 5/147; F01D 9/041; F01D 17/162; F01D 7/00; F05D 2240/12; F05D 2240/128

See application file for complete search history.

(56) References Cited

U.S. PATENT DOCUMENTS

| | | | | |
|---|---|---|---|---|
| 4,950,129 A * | 8/1990 | Patel | F01D 5/26 | 415/148 |
| 7,806,653 B2 * | 10/2010 | Burton | F01D 5/145 | 415/191 |
| 9,004,850 B2 * | 4/2015 | Nichols | F04D 29/462 | 415/152.2 |
| 10,273,976 B2 * | 4/2019 | Jemora | F04D 29/563 | |
| 10,527,060 B2 * | 1/2020 | Reynolds | F04D 29/544 | |
| 10,677,078 B2 * | 6/2020 | Tse | F02C 3/145 | |

(Continued)

FOREIGN PATENT DOCUMENTS

JP S5987203 A 5/1984

OTHER PUBLICATIONS

EP Search Report for EP Patent Application No. 23190673.6 dated Jan. 9, 2024.

*Primary Examiner* — Brian Christopher Delrue

(74) *Attorney, Agent, or Firm* — Getz Balich LLC

(57) ABSTRACT

A gas turbine engine apparatus includes a variable vane. The variable vane includes a pivot axis and an airfoil. The variable vane is configured to pivot about the pivot axis between a first position and a second position. The airfoil extends spanwise along a span line between a first end and a second end. The airfoil extends chordwise along a chord line between a leading edge and a trailing edge. The chord line is angularly offset from a reference plane containing the pivot axis by a twist angle. A first section of the airfoil is disposed at the first end. The twist angle varies as the first section extends spanwise along the span line. A second section of the airfoil is disposed spanwise between the first section and the second end. The twist angle is uniform as the second section extends spanwise along the span line.

18 Claims, 11 Drawing Sheets

(56) References Cited

U.S. PATENT DOCUMENTS

| | | | | |
|---|---|---|---|---|
| 2008/0317587 | A1 | 12/2008 | Lord | |
| 2013/0287542 | A1* | 10/2013 | Nichols | F01D 17/165<br>415/208.1 |
| 2015/0275916 | A1* | 10/2015 | Marshall | F04D 29/563<br>29/888.025 |
| 2019/0078450 | A1 | 3/2019 | Eley | |
| 2019/0186501 | A1 | 6/2019 | Kalitzin | |
| 2022/0170380 | A1* | 6/2022 | Poick | F04D 29/563 |

* cited by examiner

VARIABLE VANE AIRFOIL WITH AIRFOIL TWIST TO ACCOMMODATE PROTUBERANCE

TECHNICAL FIELD

This disclosure relates generally to a gas turbine engine and, more particularly, to a variable vane array for the gas turbine engine.

BACKGROUND INFORMATION

A gas turbine engine may include a variable vane array for guiding air flow into a compressor section. This variable vane array may also be used to regulate air flow into the compressor section. Various variable vane array configurations are known in the art. While these known variable vane arrays have various advantages, there is still room in the art for improvement. There is a need in the art, in particular, for a variable vane array which facilitates relatively large variable vane pivot angles.

SUMMARY

According to an aspect of the present disclosure, an apparatus is provided for a gas turbine engine. This gas turbine engine apparatus includes a variable vane. The variable vane includes a pivot axis and an airfoil. The variable vane is configured to pivot about the pivot axis between a first position and a second position. The airfoil extends spanwise along a span line between a first end and a second end. The airfoil extends chordwise along a chord line between a leading edge and a trailing edge. The chord line is angularly offset from a reference plane containing the pivot axis by a twist angle. The airfoil extends laterally between a first side and a second side. A first section of the airfoil is disposed at the first end. The twist angle varies as the first section extends spanwise along the span line. A second section of the airfoil is disposed spanwise between the first section and the second end. The twist angle is uniform as the second section extends spanwise along the span line.

According to another aspect of the present disclosure, another apparatus is provided for a gas turbine engine. This gas turbine engine apparatus includes an annular engine flowpath, a protuberance and a variable vane. The annular engine flowpath extends circumferentially around a centerline. The protuberance projects into the engine flowpath. The variable vane extends across the engine flowpath. The variable vane includes a pivot axis and an airfoil. The variable vane is configured to pivot about the pivot axis between a first position and a second position. The airfoil extends spanwise along a span line between a first end and a second end. The airfoil extends chordwise along a chord line between a leading edge and a trailing edge. The airfoil extends laterally between a first side and a second side. A first section of the airfoil is disposed at the first end. The first section at the first end is circumferentially offset from the protuberance when the variable vane is in the first position and in the second position. A second section of the airfoil is disposed spanwise between the first section and the second end. The second section is circumferentially offset from the protuberance when the variable vane is in the first position. The second section circumferentially overlaps the protuberance when the variable vane is in the second position.

According to still another aspect of the present disclosure, another apparatus is provided for a gas turbine engine. This gas turbine engine apparatus includes a compressor section and a variable vane at an inlet to the compressor section. The variable vane includes a pivot axis and an airfoil. The variable vane is configured to pivot about the pivot axis at least forty degrees between a first position and a second position. The airfoil extends spanwise along a span line between a first end and a second end. The airfoil extends chordwise along a chord line between a leading edge and a trailing edge. The airfoil extends laterally between a first side and a second side. A first section of the airfoil is disposed at the first end. A stagger angle and/or a camber of the airfoil changes as the first section extends spanwise along the span line towards the first end.

The gas turbine engine apparatus may also include a second variable vane extending across the engine flowpath. The second variable vane may circumferentially neighbor the variable vane, and the second variable vane may include a button. The button may be configured as or otherwise include the protuberance.

The chord line may be angularly offset from a reference plane containing the pivot axis by a twist angle. The twist angle may change as the first section extends spanwise along the span line.

The twist angle may be uniform as the second section extends spanwise along the span line.

The gas turbine engine apparatus may also include a protuberance. The first section and the second section may be misaligned from the protuberance when the variable vane is in the first position. At least a portion of the first section at the first end may be misaligned with the protuberance. At least a portion of the second section may be aligned with the protuberance when the variable vane is in the second position.

The gas turbine engine apparatus may also include a second variable vane including a button. The button may be configured as or otherwise include the protuberance.

The first section may have a first span length along the span line. The second section may have a second span length along the span line. The second span length may be greater than the first span length.

The first section may form less than twenty-five percent of the airfoil along the span line.

The second section may form at least fifty percent of the airfoil along the span line.

The first section may extend along the span line from the second section to the first end. The second section may extend along the span line from the first section to the second end.

The twist angle may increase as the first section extends spanwise towards the first end.

The twist angle may vary along the first section by varying a stagger angle of the first section.

The twist angle may also vary along the first section by varying a camber of the first section.

The twist angle may vary along the first section by varying a camber of the first section.

The variable vane may be configured to pivot about the pivot axis more than forty degrees.

The gas turbine engine apparatus may also include a compressor section. The variable vane may be configured as an inlet guide vane for the compressor section.

The gas turbine engine apparatus may also include a plurality of vanes arranged circumferentially about a centerline. The vanes may include the variable vane. The pivot axis may be parallel with the centerline.

The gas turbine engine apparatus may also include a plurality of vanes arranged circumferentially about a centerline. The vanes may include the variable vane. The pivot axis may be angularly offset from the centerline.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
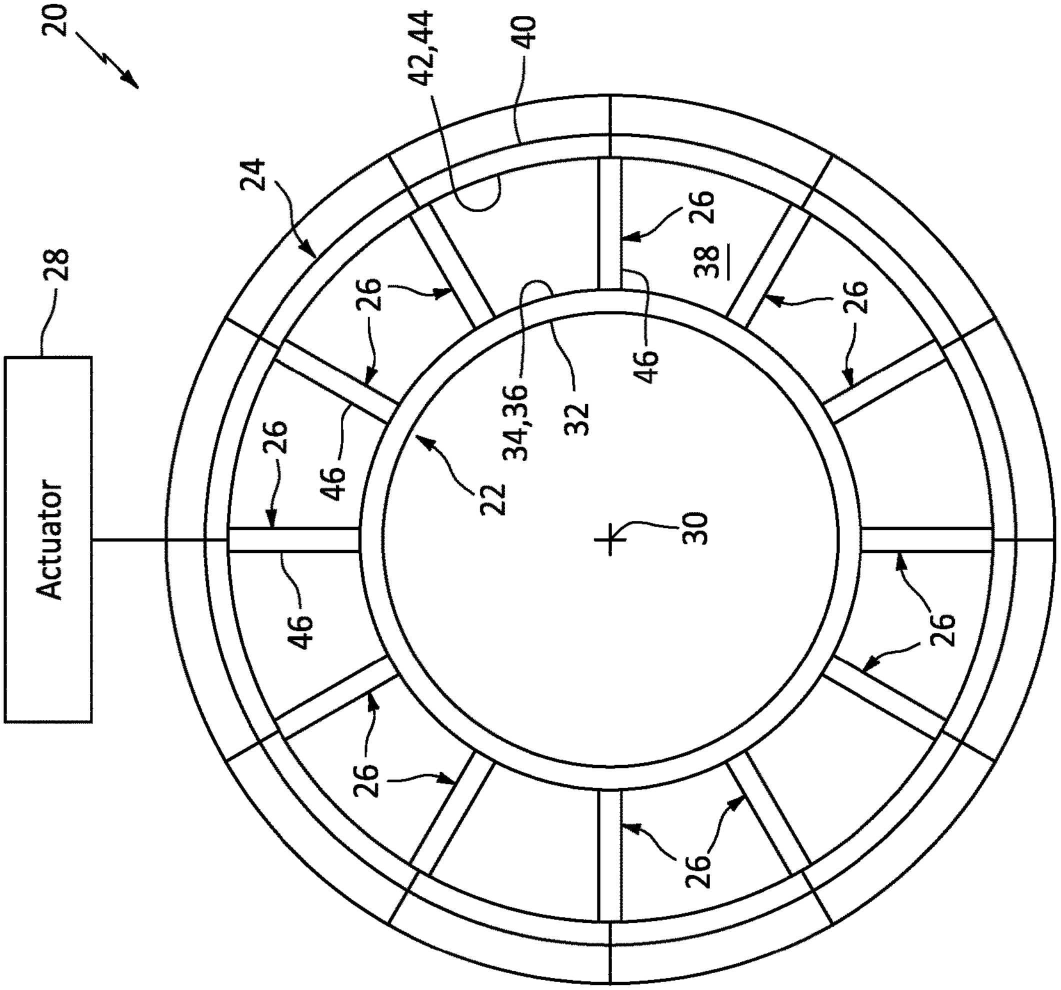
FIG. 1 is a schematic cross-sectional illustration of a variable vane array for a gas turbine engine.

FIG. 1 illustrates a variable vane array 20 for a gas turbine engine. This vane array 20 may be configured as a variable inlet guide vane array. The vane array 20, for example, may be arranged at (e.g., in, adjacent or proximate) an inlet to a compressor section of the gas turbine engine. The vane array 20 may alternatively be configured as a variable exit guide vane array. The vane array 20, for example, may be arranged at an exit from the compressor section. The vane array 20 may still alternatively be arranged intermediately within the compressor section (e.g., between two stages of the compressor section), or arranged adjacent or within another section of the gas turbine engine. The vane array 20 of FIG. 1 includes a first (e.g., inner) platform 22, a second (e.g., outer) platform 24, a plurality of variable vanes 26 (e.g., variable guide vanes such as inlet or exit guide vanes) and a vane actuator 28 for actuating (e.g., pivoting) the variable vanes 26.

Figure 2:
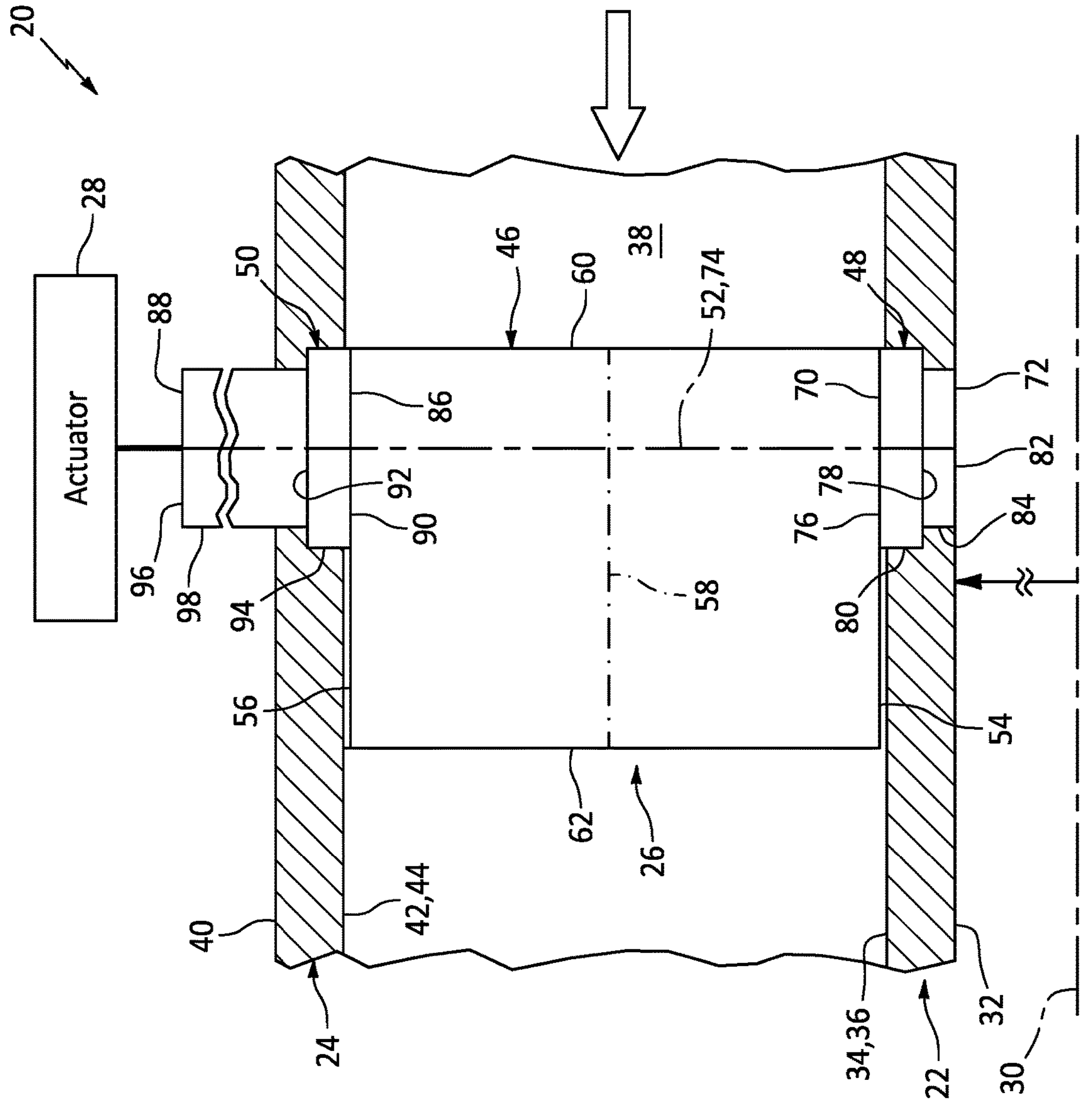
FIG. 2 is a partial side sectional illustration of the variable vane array.

The first platform 22 extends circumferentially about (e.g., completely around) an axial centerline 30 of the gas turbine engine providing the first platform 22 with, for example, a tubular geometry. The first platform 22 of FIG. 1 extends radially between and to an exterior side 32 (e.g., radial inner side) of the first platform 22 and an interior side 34 (e.g., radial outer side) of the first platform 22. Referring to FIG. 2, at least a portion (or an entirety) of the first platform 22 extends axially along the axial centerline 30. The first platform 22 of FIGS. 1 and 2 includes a first platform surface 36 at the first platform interior side 34. This first platform surface 36 forms a first (e.g., inner) peripheral boundary of a flowpath 38 (e.g., an annular core flowpath) through the vane array 20 and within the gas turbine engine.

Referring to FIG. 1, the second platform 24 extends circumferentially about (e.g., completely around) the axial centerline 30 providing the second platform 24 with, for example, a tubular geometry. The second platform 24 of FIG. 1 extends radially between and to an exterior side 40 (e.g., radial outer side) of the second platform 24 and an interior side 42 (e.g., radial inner side) of the second platform 24. Referring to FIG. 2, at least a portion (or an entirety) of the second platform 24 extends axially along the axial centerline 30. The second platform 24 of FIGS. 1 and 2 includes a second platform surface 44 at the second platform interior side 42. This second platform surface 44 axially overlaps and circumscribes the first platform surface 36, and may be generally parallel with the first platform surface 36. The second platform surface 44 forms a second (e.g., outer) peripheral boundary of the engine flowpath 38. The engine flowpath 38 of FIG. 2 may thereby extend radially between and to the first platform surface 36 and the second platform surface 44.

Referring to FIG. 1, the variable vanes 26 are arranged circumferentially about the axial centerline 30 in a circular array. Within this circular array, each variable vane 26 is located circumferentially between and is circumferentially spaced from its respective circumferentially neighboring (e.g., adjacent) variable vanes 26. Each of the variable vanes 26 of FIG. 1 extends radially across the engine flowpath 38 between and to the first platform 22 and the second platform 24. Referring to FIG. 2, each of the variable vanes 26 includes a vane airfoil 46, a vane first (e.g., inner) attachment 48 and a vane second (e.g., outer) attachment 50.

Figure 3:
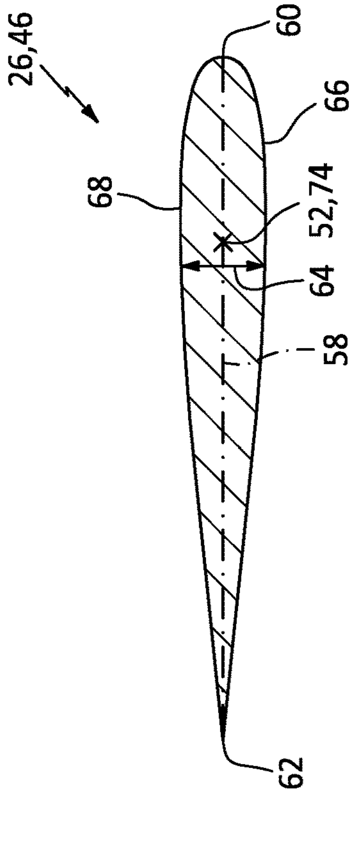
FIG. 3 is a cross-sectional illustration of a variable vane airfoil.

The vane airfoil 46 extends spanwise along a span line 52 of the vane airfoil 46 between and to a first end 54 (e.g., an inner, base end) of the vane airfoil 46 and a second end 56 (e.g., an outer, tip end) of the vane airfoil 46. The vane airfoil 46 extends chordwise along a chord line 58 of the vane airfoil 46 between and to a leading edge 60 of the vane airfoil 46 and a trailing edge 62 of the vane airfoil 46. Referring to FIG. 3, the vane airfoil 46 extends laterally along a thickness 64 of the vane airfoil 46 between and to a first side 66 of the vane airfoil 46 and a second side 68 of the vane airfoil 46. The airfoil first side 66 and the airfoil second side 68 extend spanwise along the span line 52 between and to the airfoil first end 54 and the airfoil second end 56 (see FIG. 2). The airfoil first side 66 and the airfoil second side 68 extend chordwise along the chord line 58 between and meet at the airfoil leading edge 60 and the airfoil trailing edge 62.

Referring to FIG. 2, the first attachment 48 is connected to (e.g., formed integral with or otherwise fixedly attached to) the vane airfoil 46 at its airfoil first end 54. This first attachment 48 of FIG. 2 includes a first button 70 (e.g., a puck) and a first shaft 72.

The first button 70 extends along a vane pivot axis 74 of the respective variable vane 26 between and to a flowpath side 76 of the first button 70 and a bearing side 78 of the first button 70, which vane pivot axis 74 may be parallel with the airfoil span line 52. The first button flowpath side 76 is adjacent the vane airfoil 46 at its airfoil first end 54. At least a portion of the first button flowpath side 76 is offset from the first platform surface 36 such that the first button 70 projects slightly into the engine flowpath 38 to its first button flowpath side 76, thereby forming a protuberance in the engine flowpath 38. The first button 70 projects radially (relative to the vane pivot axis 74) out to an (e.g., cylindrical) outer periphery 80 of the first attachment 48 and its first button 70. This first button outer periphery 80 may be axially aligned with (or offset from) the airfoil leading edge 60. The first button outer periphery 80 may be recessed (e.g., spaced towards the vane pivot axis 74 from) the airfoil trailing edge 62 such that the vane airfoil 46 projects chordwise out from (e.g., overhangs out from) the first attachment 48 and its first button 70 to the airfoil trailing edge 62.

The first shaft 72 is connected to the first button 70 at the first button bearing side 78. The first shaft 72 projects along the vane pivot axis 74 out from the first button 70 to a distal end 82 of the first shaft 72. The first shaft 72 projects radially (relative to the vane pivot axis 74) out to an (e.g., cylindrical) outer periphery 84 of the first shaft 72. This first shaft outer periphery 84 is recessed inwards from the first button outer periphery 80.

The second attachment 50 is connected to (e.g., formed integral with or otherwise fixedly attached to) the vane airfoil 46 at its airfoil second end 56. This second attachment 50 of FIG. 2 includes a second button 86 (e.g., a puck) and a second shaft 88.

The second button 86 extends along the vane pivot axis 74 of the respective variable vane 26 between and to a flowpath side 90 of the second button 86 and a bearing side 92 of the second button 86. The second button flowpath side 90 is adjacent the vane airfoil 46 at its airfoil second end 56. At least a portion of the second button flowpath side 90 may be offset from the second platform surface 44 such that the second button 86 projects slightly into the engine flowpath 38 to its second button flowpath side 90. The second button 86 projects radially (relative to the vane pivot axis 74) out to an (e.g., cylindrical) outer periphery 94 of the second attachment 50 and its second button 86. This second button outer periphery 94 may be axially aligned with (or offset from) the airfoil leading edge 60. The second button outer periphery 94 may be recessed (e.g., spaced towards the vane pivot axis 74 from) the airfoil trailing edge 62 such that the vane airfoil 46 projects chordwise out from (e.g., overhangs out from) the second attachment 50 and its second button 86 to the airfoil trailing edge 62.

The second shaft 88 is connected to the second button 86 at the second button bearing side 92. The second shaft 88 projects along the vane pivot axis 74 out from the second button 86 to a distal end 96 of the second shaft 88. The second shaft 88 projects radially (relative to the vane pivot axis 74) out to an (e.g., cylindrical) outer periphery 98 of the second shaft 88. This second shaft outer periphery 98 is recessed inwards from the second button outer periphery 94.

Figure 4:
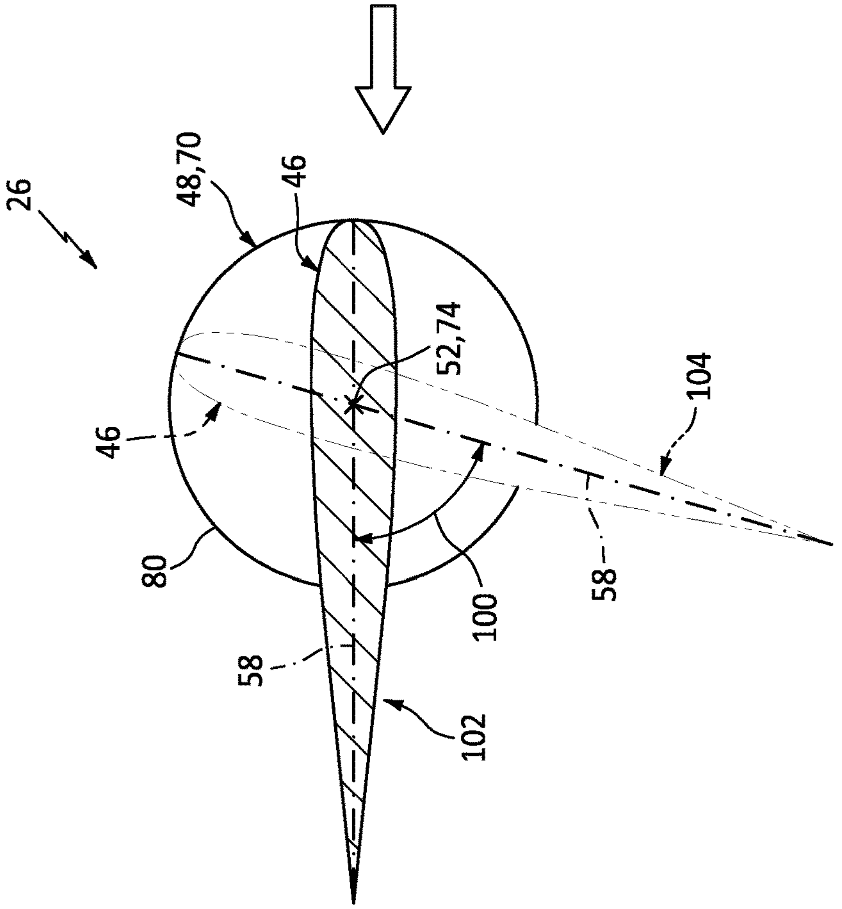
FIG. 4 is a schematic illustration depicting a variable vane with its variable vane airfoil pivoting between a first position and a second position.

Each variable vane 26 and its vane airfoil 46 are pivotally connected to the first platform 22 by its first attachment 48. Each first attachment 48, for example, is mated with/received within a respective first receptacle in the first platform 22. Each variable vane 26 and its vane airfoil 46 are pivotally connected to the second platform 24 by its second attachment 50. Each second attachment 50, for example, is mated with/received within a respective second receptacle in the second platform 24. With this arrangement, the attachments 48 and 50 function as bearings between the respective variable vane 26 and the platforms 22 and 24. Referring to FIG. 4, each variable vane 26 may thereby pivot a select number of degrees (referred to below as a pivot angle 100) about its respective vane pivot axis 74 between and to a first position 102 (e.g., an open position) and a second position 104 (e.g., a closed position). This pivot angle 100 may be greater than forty degrees (40°), but may be less than ninety degrees (90°). The pivot angle 100, for example, may be at least fifty degrees (50°), sixty degrees (60°) or seventy degrees (70°). Such a large pivot angle 100 may facilitate substantially metering (e.g., closing off) gas flow (e.g., air flow) through the vane array 20 and, for example, into the compressor section when the variable vanes 26 are in their second positions 104. The present disclosure, however, is not limited to such a relatively large pivot angle. The pivot angle 100, for example, may alternatively be less than forty degrees (40°) depending on, for example, other parameters of the vane array 20 such as variable vane spacing.

Figure 5:
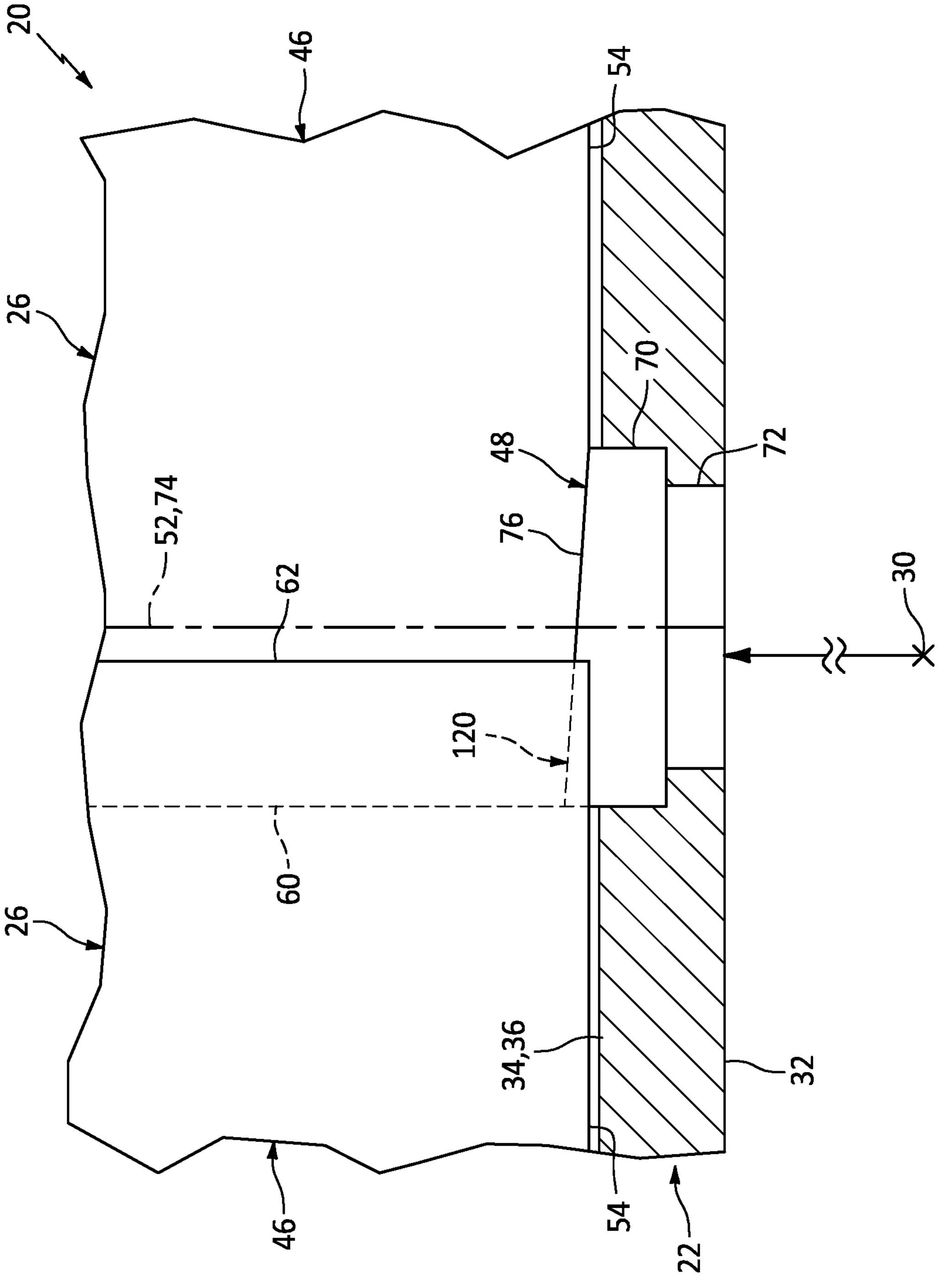
FIG. 5 is a partial cross-sectional illustration of the variable vane array with its variable vane airfoils in the second positions.
Figure 6:
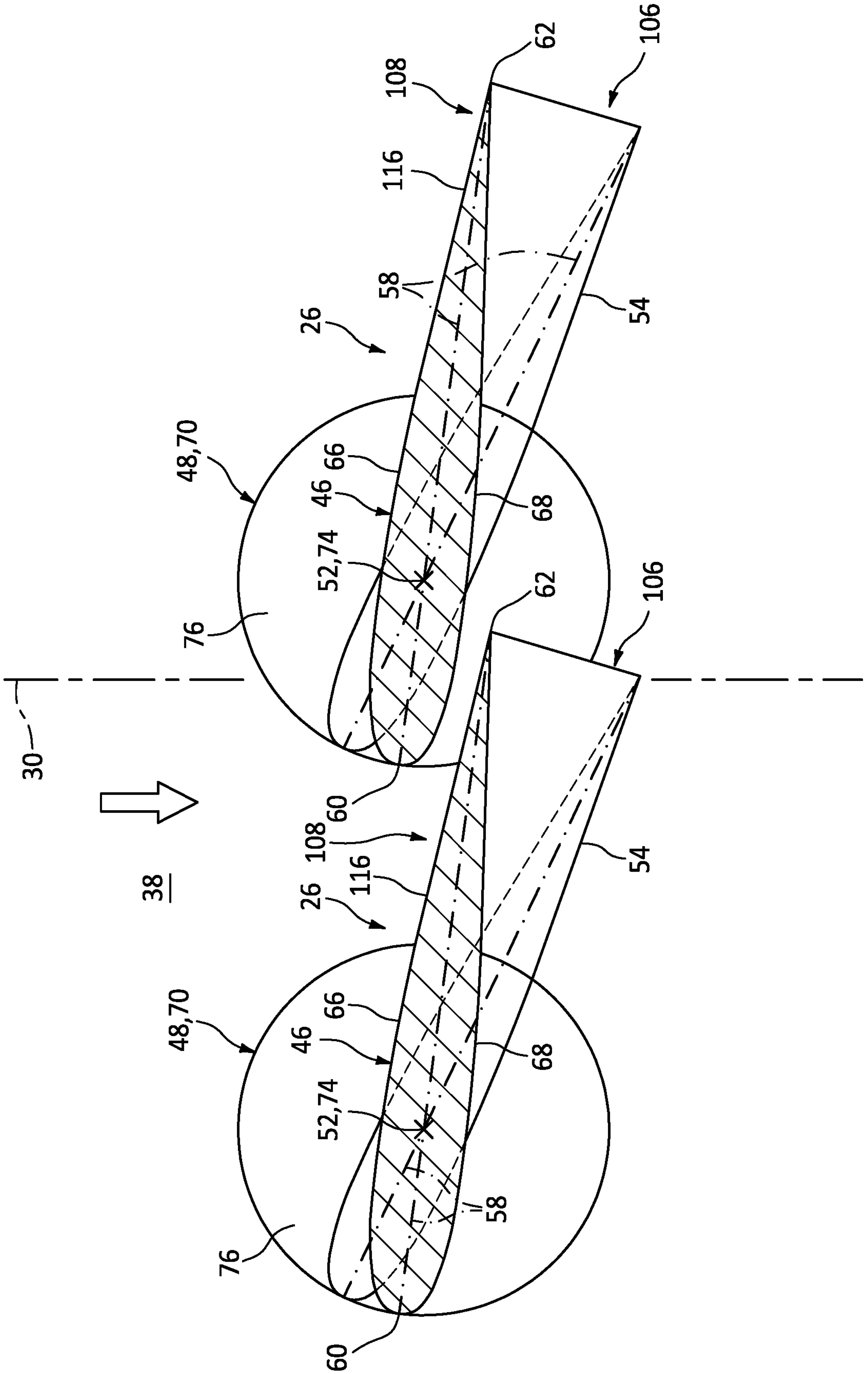
FIG. 6 is a sectional illustration of the variable vane array with two of its variable vane airfoils in the second positions.

Referring to FIGS. 5 and 6, when the variable vanes 26 are in their second positions, each vane airfoil 46 may be in close proximity (e.g., close) to a circumferentially neighboring one of the vane airfoils 46. Each vane airfoil 46 may therefore also be in close proximity to a circumferentially neighboring one of the first attachments 48 and its first button 70. To prevent interference (e.g., contact) between the vane airfoils 46 and the first buttons 70, at least a section of each vane airfoil 46 may be configured with twist to provide clearance between that vane airfoil 46 (e.g., at a corner region between the airfoil first end 54 and the airfoil trailing edge 62) and a respective first button 70.

Figure 8:
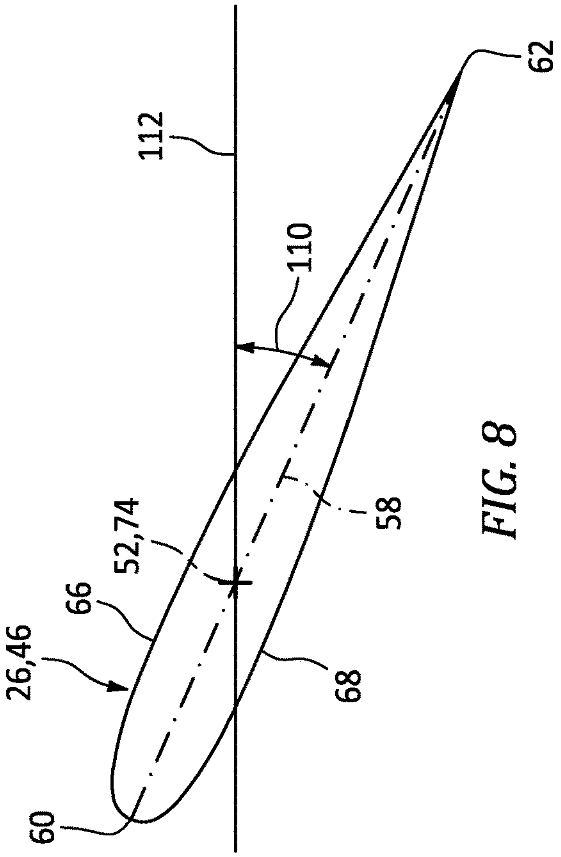
FIG. 8 is an illustration depicting a twist angle between a chord line of the variable vane airfoil and a reference plane.
Figure 7:
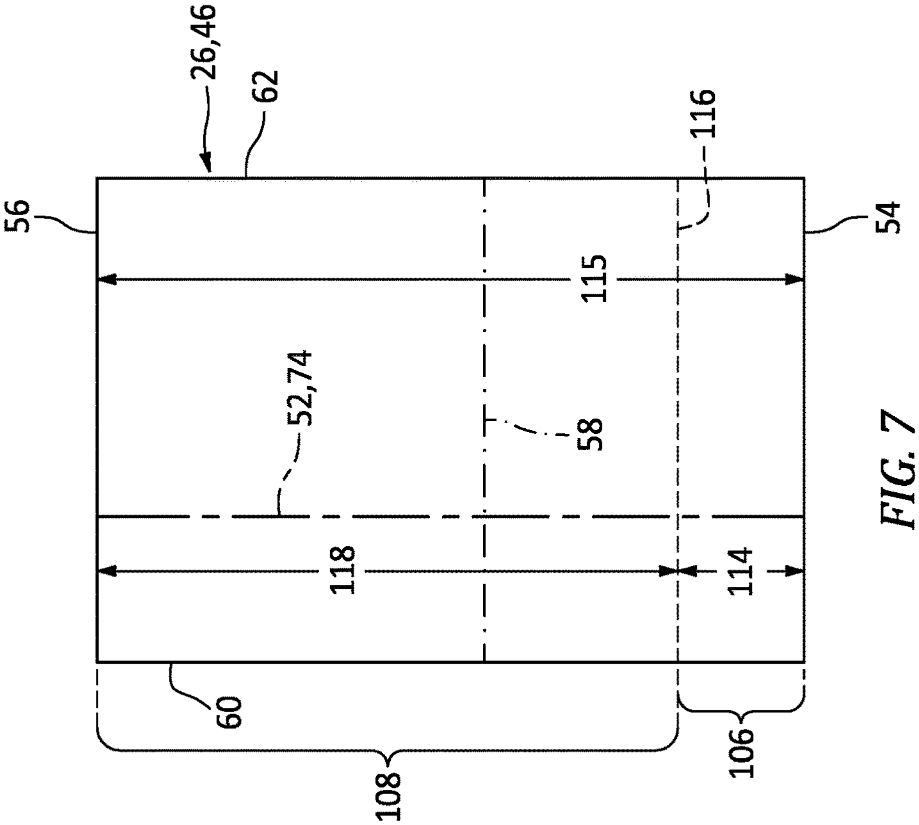
FIG. 7 is an illustration of a side of the variable vane airfoil.

Referring to FIG. 7, to provide each vane airfoil 46 with its twist/its clearance, each vane airfoil 46 includes one or more spanwise sections 106 and 108. Each of these airfoil sections 106 and 108 extends chordwise between and to the airfoil leading edge 60 and the airfoil trailing edge 62. Each of the airfoil sections 106 and 108 extends laterally between and to the airfoil first side 66 and the airfoil second side 68 (see FIG. 6). At least (or only) one of the airfoil sections 106 and 108 includes twist. This twist may be characterized by how a twist angle 110 varies (or remains uniform) as the respective airfoil section (e.g., 106, 108) extend spanwise along the span line 52. Referring to FIG. 8, the twist angle 110 may be measured between the chord line 58 and a reference plane 112 containing the vane pivot axis 74.

Figure 9:
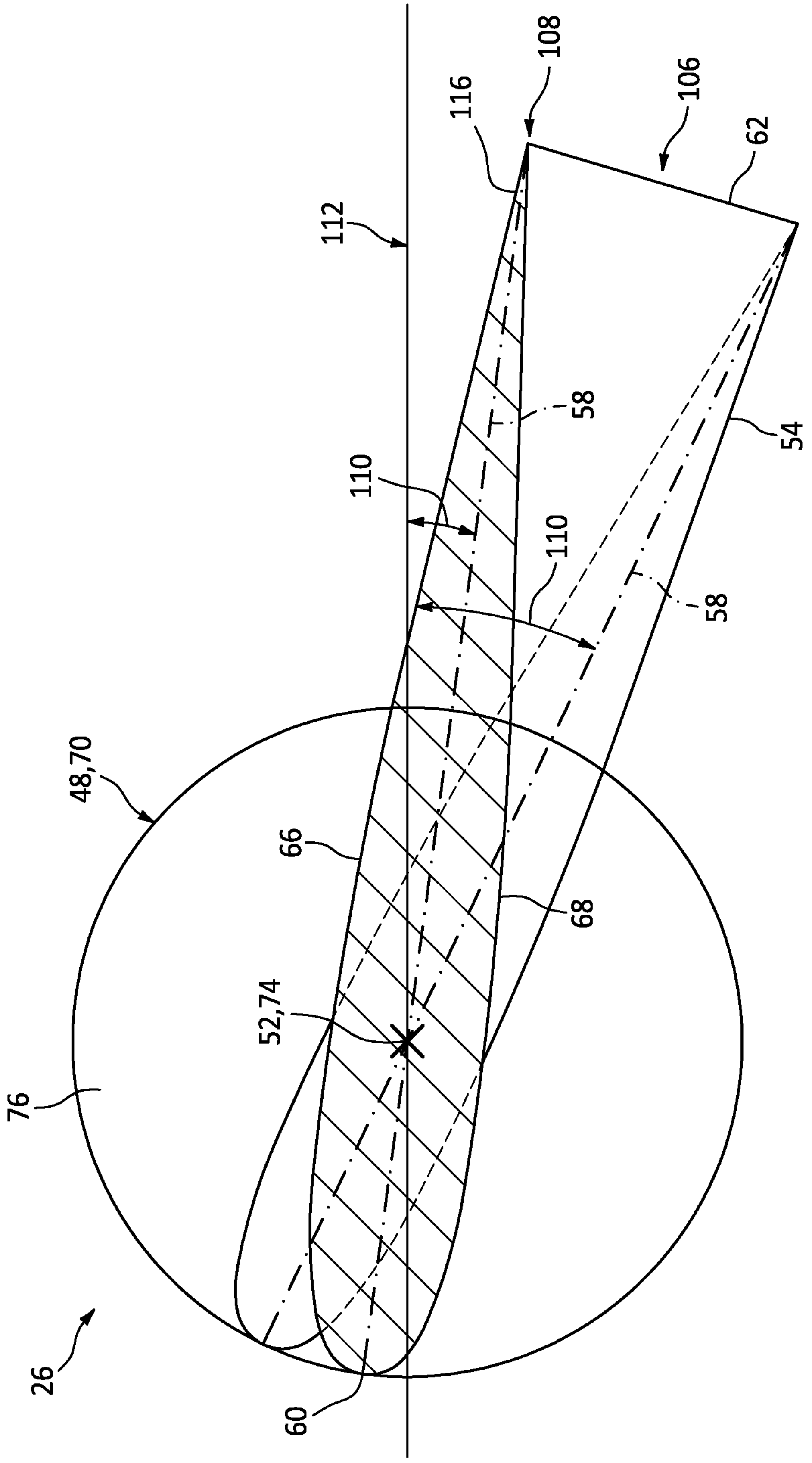
FIG. 9 is a cross-sectional illustration of the variable vane at an intersection between a first section and a second section of the variable vane airfoil.
Figure 10B:
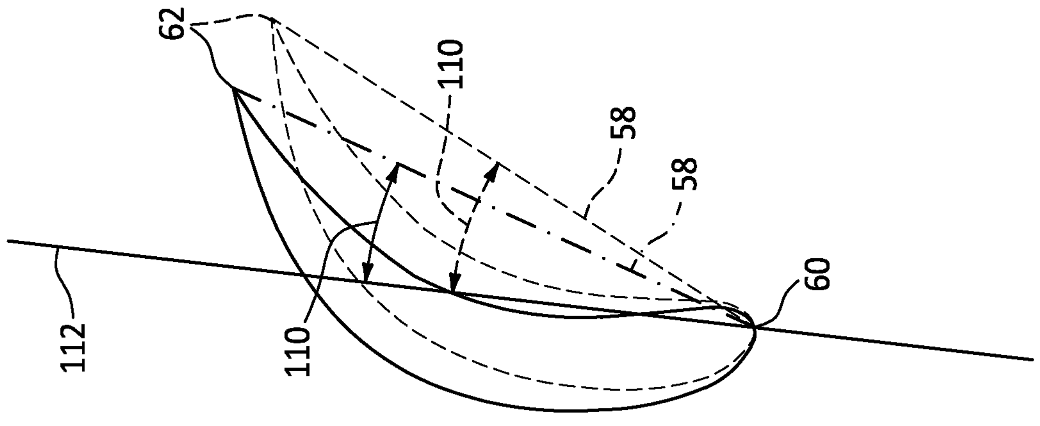
FIG. 10B is a schematic illustration depicting twist provided by varying airfoil camber.
Figure 10A:
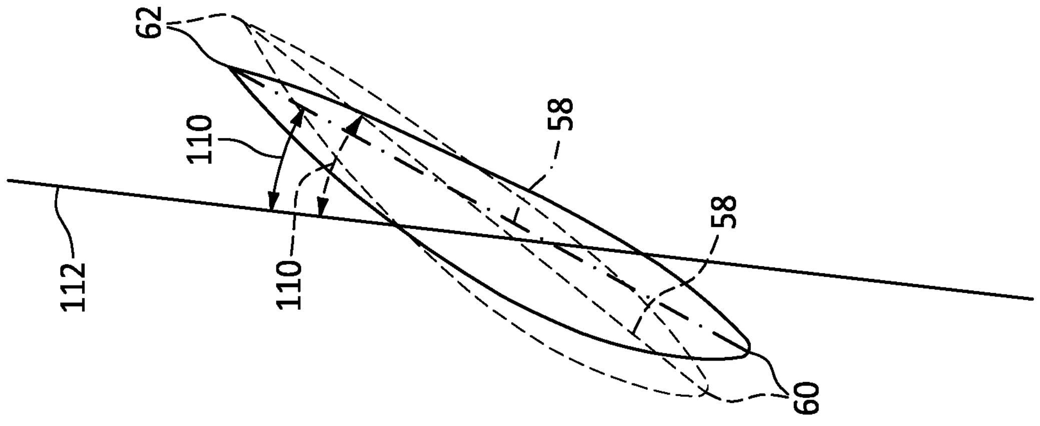
FIG. 10A is a schematic illustration depicting twist provided by varying stagger angle.

Referring to FIG. 7, the first section 106 is disposed at (e.g., on, adjacent or proximate) the airfoil first end 54. The first section 106 of FIG. 7, for example, projects spanwise along the span line 52 (e.g., axially along the vane pivot axis 74) out from the second section 108 towards (e.g., to) the airfoil first end 54. As the first section 106 extends spanwise along the span line 52 from the second section 108 towards (e.g., to) the airfoil first end 54, the twist angle 110 (see FIG. 9) continuously and/or incrementally varies (e.g., increases, or alternatively decreases) to provide this first section 106 with twist. The twist angle 110 may be varied according to a linear function or a non-linear function. The twist angle 110 may be varied by varying a stagger angle of the first section 106 by pivoting an entire cross-section/slice of the vane airfoil 46; e.g., see FIG. 10A. The twist angle 110 may also or alternatively be varied by varying camber of the first section 106; e.g., see FIG. 10B. The amount of twist and the change in the twist angle 110 may be tailored to provide, for example, just enough clearance between the vane airfoils 46 and the first buttons 70; e.g., see FIGS. 5 and 6.

Referring to FIG. 7, the first section 106 has a first span length 114 measured between an intersection 116 between the first section 106 and the second section 108 and the airfoil first end 54. The first span length 114 may be sized to tailor (e.g., minimize) twist in the vane airfoil 46/focus the twist in the vane airfoil 46 to the region of the vane airfoil 46 that would otherwise contact a respective first button 70. The first span length 114, for example, may account for less than twenty-five percent (25%) of a total span length 115 of the vane airfoil 46; e.g., less than twenty percent (20%), fifteen percent (15%) or ten percent (10%) of the total span length 115. However, in other embodiments, the first span length 114 may account for more than twenty-five percent (25%) of the total span length 115 when additional twist is needed or desirable for performance purposes, for example.

Figure 11:
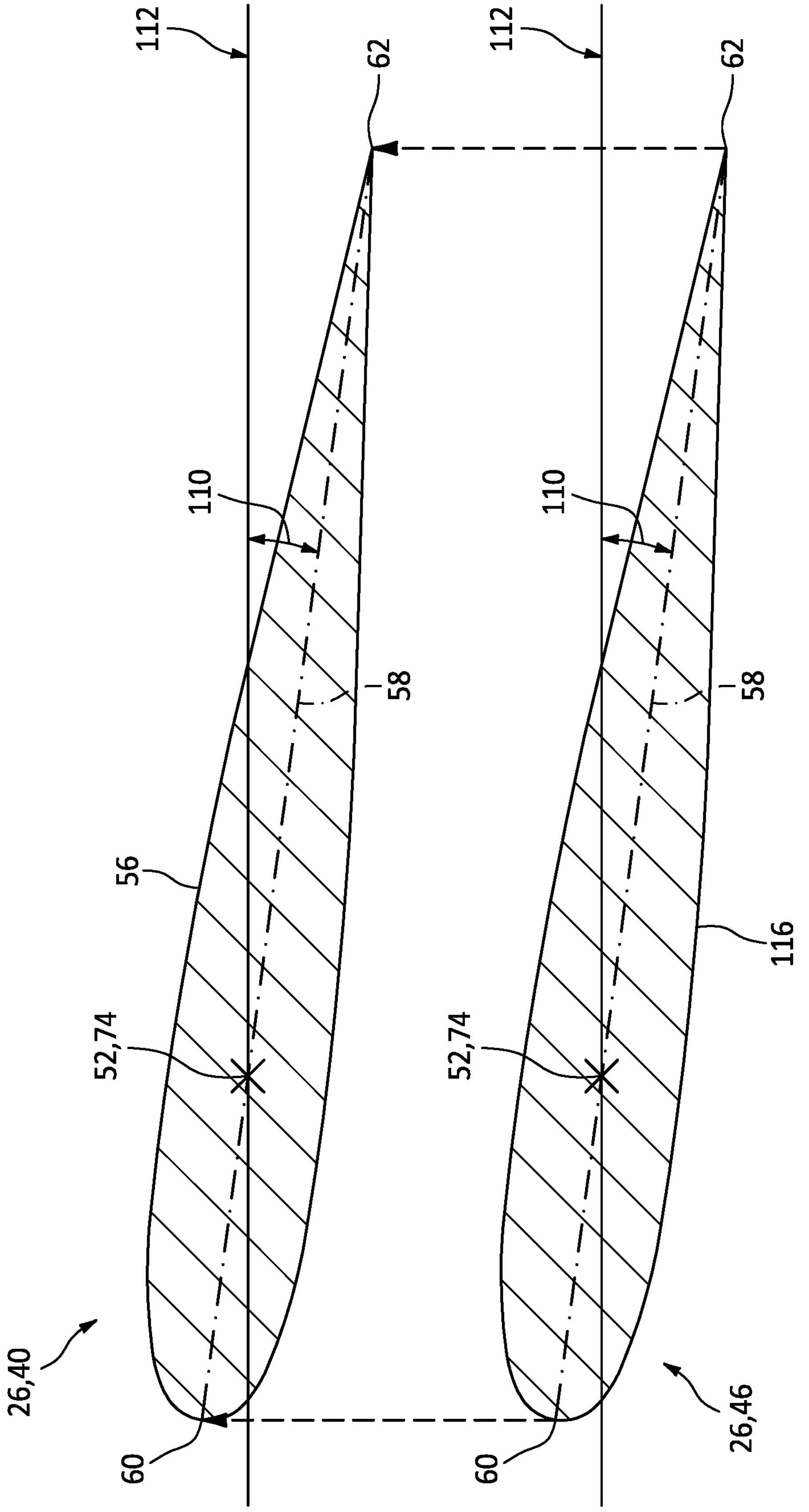
FIG. 11 is a schematic illustration depicting twist angle at two ends of the second section, where airfoil slices at the two ends are shown side by side for ease of illustration.

The second section 108 is disposed spanwise between the first section 106 and the airfoil second end 56. The second section 108 of FIG. 7, for example, projects spanwise along the span line 52 (e.g., axially along the vane pivot axis 74) out from the first section 106 towards (e.g., to) the airfoil first end 54. This second section 108 may be configured with little or no twist. For example, as the second section 108 extends spanwise along the span line 52 from the first section 106 towards (e.g., to) the airfoil second end 56, the twist angle 110 (see FIG. 11 where two airfoil slices are shown side by side for ease of illustration) may remain substantially or completely uniform. For example, the twist angle 110 at the intersection 116 between the first section 106 and the second section 108 may be equal to the twist angle 110 at the airfoil second end 56 and/or the twist angle 110 at various (e.g., all) points along the span line 52 in between the intersection 116 and the airfoil second end 56. Of course, in other embodiments, at least a portion or an entirety of the second section 108 may also be configured with twist.

Referring to FIG. 7, the second section 108 has a second span length 118 measured between the intersection 116 between the first section 106 and the second section 108 and the airfoil second end 56. The second span length 118 of FIG. 7 is different (e.g., greater) than the first span length 114. The second span length 118 may account for more than fifty percent (50%) or seventy-five percent (75%) of the total span length 115; e.g., at least or more than eighty percent (80%), eighty-five percent (85%) or ninety percent (90%) of the total span length 115. However, in other embodiments, the second span length 118 may account for less than seventy-five percent (75%) or fifty percent (50%) of the total span length 115 when additional twist is needed or desirable for performance purposes and/or when the vane airfoil 46 includes one or more additional airfoil sections; e.g., a twisted airfoil section at the airfoil second end 56.

With the foregoing arrangement, referring to FIG. 6, at least a portion or an entirety of the second section 108 may be aligned with (e.g., may circumferentially overlap, etc.) the respective first button 70 when in the second position. The first section 106 at the airfoil first end 54, by contrast, may be misaligned from (e.g., may not circumferentially overlap, may be circumferentially offset from, etc.) the respective first button 70 when in the second position. However, when the vane airfoils 46 are in the first positions, both the first section 106 and the second section 108 may be misaligned from the respective first button 70.

In the above example, an entirety of each respective first button 70 forms a protuberance 120 (e.g., see FIG. 5) which would otherwise impede pivoting of a respective vane airfoil 46 to its second position. However, in other embodiments, only a portion of the respective first button 70 may form the protuberance 120. In such embodiments, the first section 106 at the airfoil first end 54 may be aligned with (e.g., overlap) a non-protuberance portion of the first button 70 even when in the second position. Furthermore, in still other embodiments, the vane airfoils 46 may also or alternatively be configured to avoid other (e.g., non-button) protuberances such as, but not limited to, humps in a platform surface, portions of a stationary vane, etc.

Figure 12:
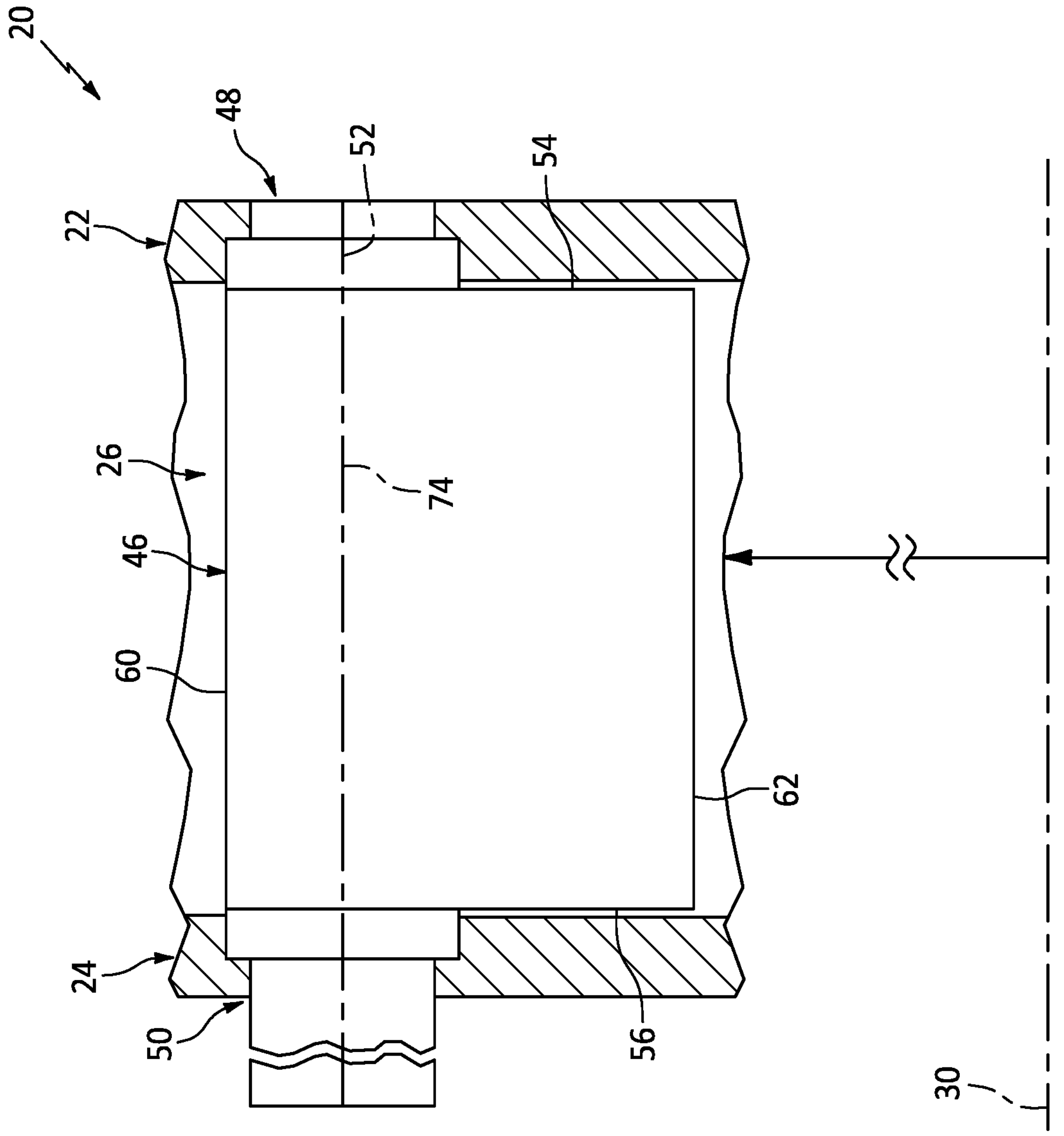
FIG. 12 is a partial side sectional illustration of the variable vane array configured for a radially extending flowpath.

The vane array 20 is described above with respect to a portion of the engine flowpath 38 that extends substantially (or only) axially along the axial centerline 30. With this arrangement, each vane pivot axis 74 is perpendicular to the axial centerline 30, or angularly offset from the axial centerline 30 by a relatively large acute angle; e.g., an angle equal to greater than forty-five degrees. In other embodiments however, referring to FIG. 12, the vane array 20 may be configured along a portion of the engine flowpath 38 that extends substantially (or only) radially with respect to the axial centerline 30. With this arrangement, each vane pivot axis 74 is parallel with the axial centerline 30, or angularly offset from the axial centerline 30 by a relatively small acute angle; e.g., an angle less than forty-five degrees.

Figure 13:
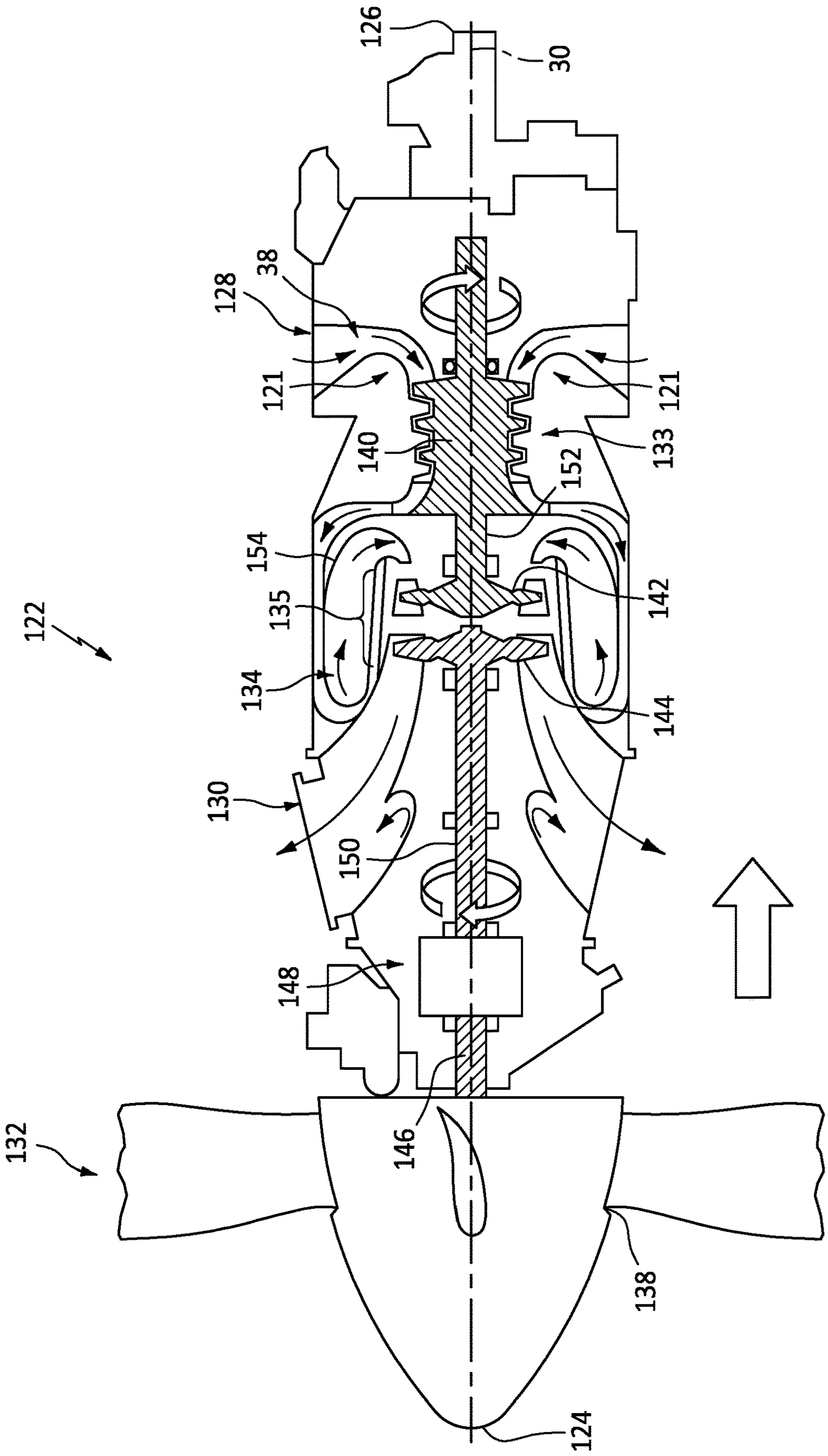
FIG. 13 is a side schematic illustration of a gas turbine engine.

FIG. 13 illustrates an example of the gas turbine engine with which the vane array 20 may be configured; e.g., in compressor inlet region 121. This gas turbine engine is configured as a turboprop gas turbine engine 122. This gas turbine engine 122 of FIG. 13 extends axially along the axial centerline 30 between a forward end 124 of the gas turbine engine 122 and an aft end 126 of the gas turbine engine 122. The gas turbine engine 122 of FIG. 13 includes an airflow inlet 128, an exhaust 130, a propulsor (e.g., a propeller) section 132, the compressor section 133, a combustor section 134 and a turbine section 135.

The airflow inlet 128 is located towards the engine aft end 126, and aft of the engine sections 132-135. The exhaust 130 is located towards the engine forward end 124, and axially between the propulsor section 132 and the engine sections 133-135.

The propulsor section 132 includes a propulsor rotor 138; e.g., a propeller. The compressor section 133 includes a compressor rotor 140. The turbine section 135 includes a high pressure turbine (HPT) rotor 142 and a low pressure turbine (LPT) rotor 144, where the LPT rotor 144 may be referred to as a power turbine rotor and/or a free turbine rotor. Each of these turbine engine rotors 138, 140, 142 and 144 includes a plurality of rotor blades arranged circumferentially about and connected to one or more respective rotor disks or hubs.

The propulsor rotor 138 of FIG. 13 is connected to the LPT rotor 144 sequentially through a propulsor shaft 146, a geartrain 148 (e.g., a transmission) and a low speed shaft 150. The compressor rotor 140 is connected to the HPT rotor 142 through a high speed shaft 152.

During gas turbine engine operation, air enters the gas turbine engine 122 through the airflow inlet 128. This air is directed into the engine flowpath 38 which extends sequentially from the airflow inlet 128, through the engine sections 133-135 (e.g., an engine core), to the exhaust 130. The air within this engine flowpath 38 may be referred to as "core air".

The core air is compressed by the compressor rotor 140 and directed into a combustion chamber of a combustor 154 in the combustor section 134. Fuel is injected into the combustion chamber and mixed with the compressed core air to provide a fuel-air mixture. This fuel-air mixture is ignited and combustion products thereof flow through and sequentially cause the HPT rotor 142 and the LPT rotor 144 to rotate. The rotation of the HPT rotor 142 drives rotation of the compressor rotor 140 and, thus, compression of air received from the airflow inlet 128. The rotation of the LPT rotor 144 drives rotation of the propulsor rotor 138, which propels air outside of the turbine engine in an aft direction to provide forward aircraft thrust.

The vane array 20 may be included in various gas turbine engines other than the one described above. The vane array 20, for example, may be included in a geared gas turbine engine where a gear train connects one or more shafts to one or more rotors in a fan section, a compressor section and/or any other engine section. Alternatively, the vane array 20 may be included in a gas turbine engine configured without a gear train. The vane array 20 may be included in a gas turbine engine configured with a single spool, with two spools, or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU) or an industrial gas turbine engine. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a gas turbine engine, comprising:

a variable vane comprising a pivot axis and an airfoil, the variable vane configured to pivot about the pivot axis between a first position and a second position;

the airfoil extending spanwise along a span line between a first end and a second end, the airfoil extending chordwise along a chord line between a leading edge and a trailing edge, the chord line angularly offset from a reference plane containing the pivot axis by a twist angle, the airfoil extending laterally between a first side and a second side;

a first section of the airfoil disposed at the first end, the twist angle varying as the first section extends spanwise along the span line;

a second section of the airfoil disposed spanwise between the first section and the second end, the twist angle uniform as the second section extends spanwise along the span line; and a protuberance;

the first section and the second section misaligned from the protuberance when the variable vane is in the first position; and at least a portion of the first section at the first end misaligned with the protuberance; and at least a portion of the second section aligned with the protuberance when the variable vane is in the second position.

2. The apparatus of claim 1, further comprising:

a second variable vane comprising a button;

the button comprising the protuberance.

3. The apparatus of claim 1, wherein the first section has a first span length along the span line;

the second section has a second span length along the span line; and the second span length is greater than the first span length.

4. The apparatus of claim 1, wherein the first section forms less than twenty-five percent of the airfoil along the span line.

5. The apparatus of claim 1, wherein the second section forms at least fifty percent of the airfoil along the span line.

6. The apparatus of claim 1, wherein the first section extends along the span line from the second section to the first end; and the second section extends along the span line from the first section to the second end.

7. The apparatus of claim 1, wherein the twist angle increases as the first section extends spanwise towards the first end.

8. The apparatus of claim 1, wherein the twist angle varies along the first section by varying a stagger angle of the first section.

9. The apparatus of claim 8, wherein the twist angle further varies along the first section by varying a camber of the first section.

10. The apparatus of claim 1, wherein the twist angle varies along the first section by varying a camber of the first section.

11. The apparatus of claim 1, wherein the variable vane is configured to pivot about the pivot axis more than forty degrees.

12. The apparatus of claim 1, further comprising:

a compressor section;

the variable vane configured as an inlet guide vane for the compressor section.

13. The apparatus of claim 1, further comprising:

a plurality of vanes arranged circumferentially about a centerline;

the plurality of vanes comprising the variable vane; and the pivot axis parallel with the centerline.

14. The apparatus of claim 1, further comprising:

a plurality of vanes arranged circumferentially about a centerline;

the plurality of vanes comprising the variable vane; and the pivot axis angularly offset from the centerline.

15. An apparatus for a gas turbine engine, comprising:

an annular engine flowpath extending circumferentially around a centerline;

a protuberance projecting into the engine flowpath; and a variable vane extending across the engine flowpath, the variable vane comprising a pivot axis and an airfoil, and the variable vane configured to pivot about the pivot axis between a first position and a second position;

the airfoil extending spanwise along a span line between a first end and a second end, the airfoil extending chordwise along a chord line between a leading edge and a trailing edge, and the airfoil extending laterally between a first side and a second side;

a first section of the airfoil disposed at the first end, the first section at the first end circumferentially offset from the protuberance when the variable vane is in the first position and in the second position; and a second section of the airfoil disposed spanwise between the first section and the second end, the second section circumferentially offset from the protuberance when the variable vane is in the first position, and the second section circumferentially overlapping the protuberance when the variable vane is in the second position.

16. The apparatus of claim 15, further comprising:

a second variable vane extending across the engine flowpath, the second variable vane circumferentially neighboring the variable vane and comprising a button; and the button comprising the protuberance.

17. The apparatus of claim 15, wherein the chord line is angularly offset from a reference plane containing the pivot axis by a twist angle; and the twist angle changes as the first section extends spanwise along the span line.

18. The apparatus of claim 17, wherein the twist angle is uniform as the second section extends spanwise along the span line.

* * * * *